United States Patent
Bodziony et al.

(10) Patent No.: US 10,318,513 B2
(45) Date of Patent: *Jun. 11, 2019

(54) STORING DATA RECORDS

(71) Applicant: International Business Machines Corporation, Armonk, NY (US)

(72) Inventors: Michal Bodziony, Tegoborze (PL); Artur M. Gruszecki, Kraków (PL); Tomasz Kazalski, Kraków (PL); Konrad K. Skibski, Zielonki (PL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/831,535

(22) Filed: Dec. 5, 2017

(65) Prior Publication Data

US 2018/0096011 A1    Apr. 5, 2018

Related U.S. Application Data

(63) Continuation of application No. 15/223,119, filed on Jul. 29, 2016.

(51) Int. Cl.
*G06F 17/30* (2006.01)
*G06F 16/22* (2019.01)

(52) U.S. Cl.
CPC ...... *G06F 16/2272* (2019.01); *G06F 16/2219* (2019.01); *G06F 16/2282* (2019.01)

(58) Field of Classification Search
CPC ......... G06F 17/30336; G06F 17/30318; G06F 17/30339; G06F 16/2272; G06F 16/2282; G06F 16/2219
See application file for complete search history.

(56) References Cited

U.S. PATENT DOCUMENTS

| | | | | |
|---|---|---|---|---|
| 6,772,288 B1* | 8/2004 | Flake | ............... | G06F 12/0804 711/118 |
| 6,874,061 B1* | 3/2005 | Bridge | ............... | G06F 3/0608 711/114 |
| 7,159,073 B2* | 1/2007 | Longo | ............... | G06F 3/0613 711/113 |

(Continued)

FOREIGN PATENT DOCUMENTS

EP          1147469 B1       10/2011

OTHER PUBLICATIONS

"Extent size"; IBM Knowledge Center; Release date: Jan. 2014; 1 page; <https://www.ibm.com/support/knowledgecenter/SSGU8G_11.70.0/com.ibm.adref.doc/ids_adr_0294.htm>.

(Continued)

*Primary Examiner* — Jared M Bibbee
(74) *Attorney, Agent, or Firm* — Edward J. Wixted, III

(57) ABSTRACT

Embodiments of the present invention provide a method, computer program product, and a computer system for storing data records in extents. According to one embodiment a data record comprising an attribute value is received. One or more data records stored in a first extent, are identified, wherein the stored one or more data records in the first extent have at least one attribute value. The attribute value of the received data record is compared to the attribute values of the identified data records stored in the first extent. It is then determined whether to store the received data record in the first extent. Responsive to determining, not to store the received data record in the first extent, the received data record is stored in a second extent. If the first received data record is stored in a second extent, determining, an attribute value information of the second extent.

5 Claims, 3 Drawing Sheets

(56) References Cited

U.S. PATENT DOCUMENTS

| | | | |
|---|---|---|---|
| 8,775,766 B2* | 7/2014 | LeGendre | G06F 12/02 |
| | | | 711/170 |
| 9,141,648 B1 | 9/2015 | Birnbaum et al. | |
| 9,753,936 B1* | 9/2017 | Nuss | G06F 17/30082 |
| 9,953,065 B2* | 4/2018 | Gaza | G06F 17/30536 |
| 2005/0010564 A1* | 1/2005 | Metzger | G06F 17/30339 |
| 2006/0271750 A1* | 11/2006 | Serizawa | G06F 3/0607 |
| | | | 711/156 |
| 2008/0104355 A1* | 5/2008 | Moore | G06F 3/0607 |
| | | | 711/170 |
| 2012/0005449 A1* | 1/2012 | Reed | G06F 3/0607 |
| | | | 711/171 |
| 2012/0005528 A1* | 1/2012 | Belisle | G06F 11/1435 |
| | | | 714/15 |
| 2012/0278382 A1* | 11/2012 | Faith | G06F 3/064 |
| | | | 709/203 |
| 2012/0331223 A1* | 12/2012 | Bello | G06F 3/061 |
| | | | 711/114 |
| 2015/0088812 A1* | 3/2015 | Ziauddin | G06F 17/30289 |
| | | | 707/609 |
| 2015/0095379 A1* | 4/2015 | Dickie | G06F 17/3012 |
| | | | 707/803 |

OTHER PUBLICATIONS

"Using Zone Maps"; Database Data Warehousing Guide; © 2016, Oracle and/or its affiliates; Printed Jul. 6, 2016; 24 pages; <https://docs.oracle.com/database/121/DWHSG/zone_maps.htm#DWHSG9355>.

Bodziony et al., "Storing Data Records", U.S. Appl. No. 15/223,119, filed Jul. 29, 2016, 33 pages.

Appendix P—List of IBM Patents or Patent Applications Treated as Related, Filed herewith, 2 Pages.

* cited by examiner

| ID | AGE |
|---|---|
| 180 | 8 |
| 28 | 9 |
| 380 | 11 |
| 420 | 12 |
| 390 | 14 |
| 660 | 16 |
| 773 | 16.5 |
| 440 | 4 |
| 260 | 5 |
| 310 | 6 |
| 298 | 8 |

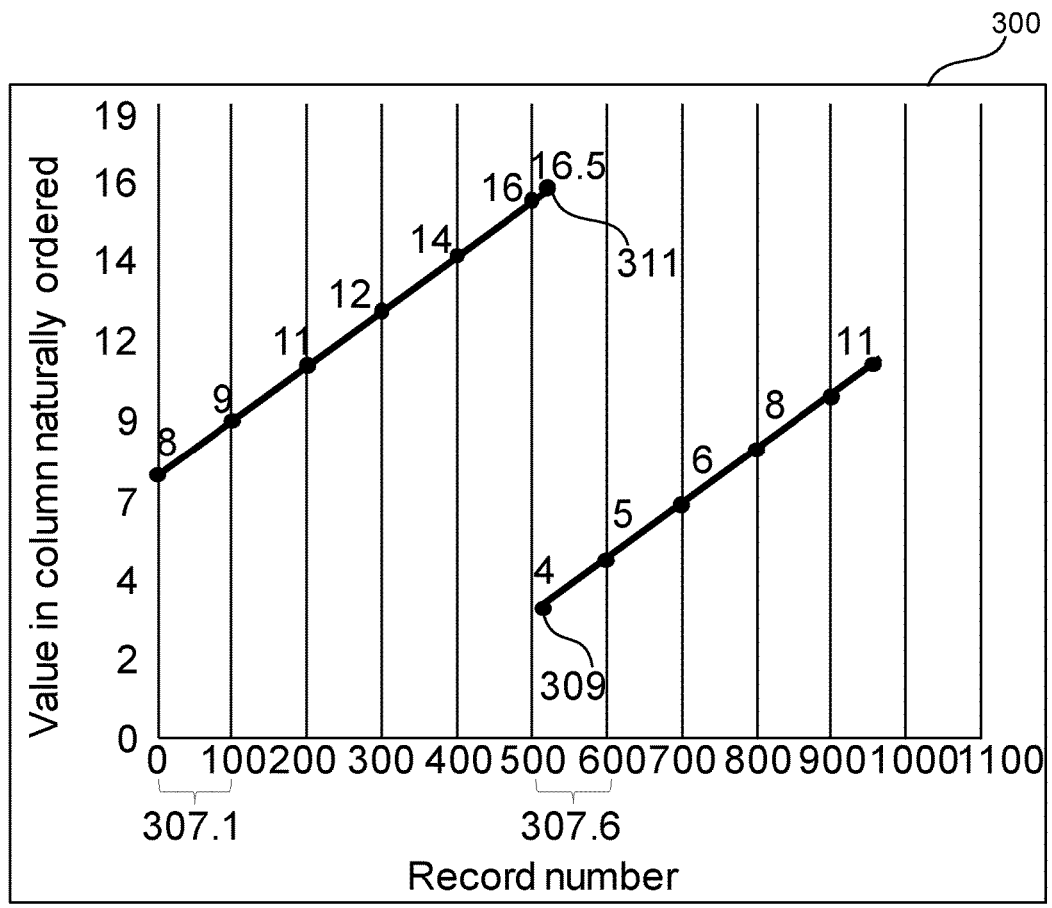
FIG. 3
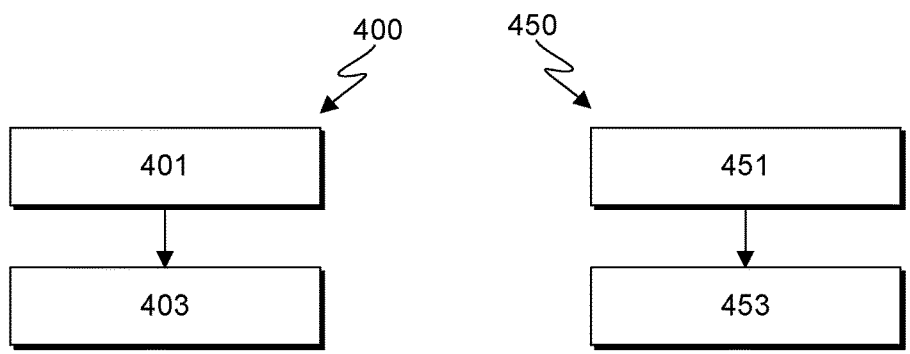
FIG. 4A
FIG. 4B

STORING DATA RECORDS

BACKGROUND OF THE INVENTION

The present invention relates generally to the field of digital computer systems, and more particularly, to a method for storing data records in analytical database systems.

An analytical database system is a read-only system that stores historical data. The information is updated on a regular basis to incorporate recent transaction data from an organization's operational systems. Generally, analytical database systems manage very large amounts of data. Analytical database systems generally are optimized for queries that must read large portions of data. Analytical database systems may offer the complete querying power of SQL. Since many analytical database systems do not focus on online transaction processing (OLTP) workload (i.e., involving point queries) such systems typically do not index each data row as the system heavily relies on scan performance.

SUMMARY

According to one embodiment of the present invention, a method for storing data records in extents is provided. The method may include: receiving a data record comprising an attribute value; identifying one or more data records stored in a first extent, wherein the stored one or more data records in the first extent have at least one attribute value, and wherein the first extent is of a predetermined size; comparing the attribute value of the received data record to the attribute values of the identified one or more data records stored in the first extent; determining whether to store the received data record in the first extent; responsive to determining, not to store the received data record in the first extent, storing the received data record in a second extent, wherein the second extent is of a predetermined size; and responsive to storing the first received data record in a second extent, determining an attribute value information of the second extent, and associating said value with the second extent.

Another embodiment of the present invention provides a computer program product for storing data records in extents, based on the method described above.

Another embodiment of the present invention provides a computer system for storing data records in extents, based on the method described above.

BRIEF DESCRIPTION OF THE DRAWINGS

FIG. 3 is an exemplary graph illustrating the attribute values that are covered by the data records in each extent, in accordance with an embodiment of the present invention;

FIG. 4A depicts a flowchart for processing a data record, by illustrating a method for analyzing the trend of data (natural order), in accordance with an embodiment of the present invention; and FIG. 4B depicts a flowchart for processing a data record, by illustrating a method to greedily maintain low difference between minimum and maximum values of attribute values in extents, in accordance with an embodiment of the present invention.

DETAILED DESCRIPTION

Figure 1:
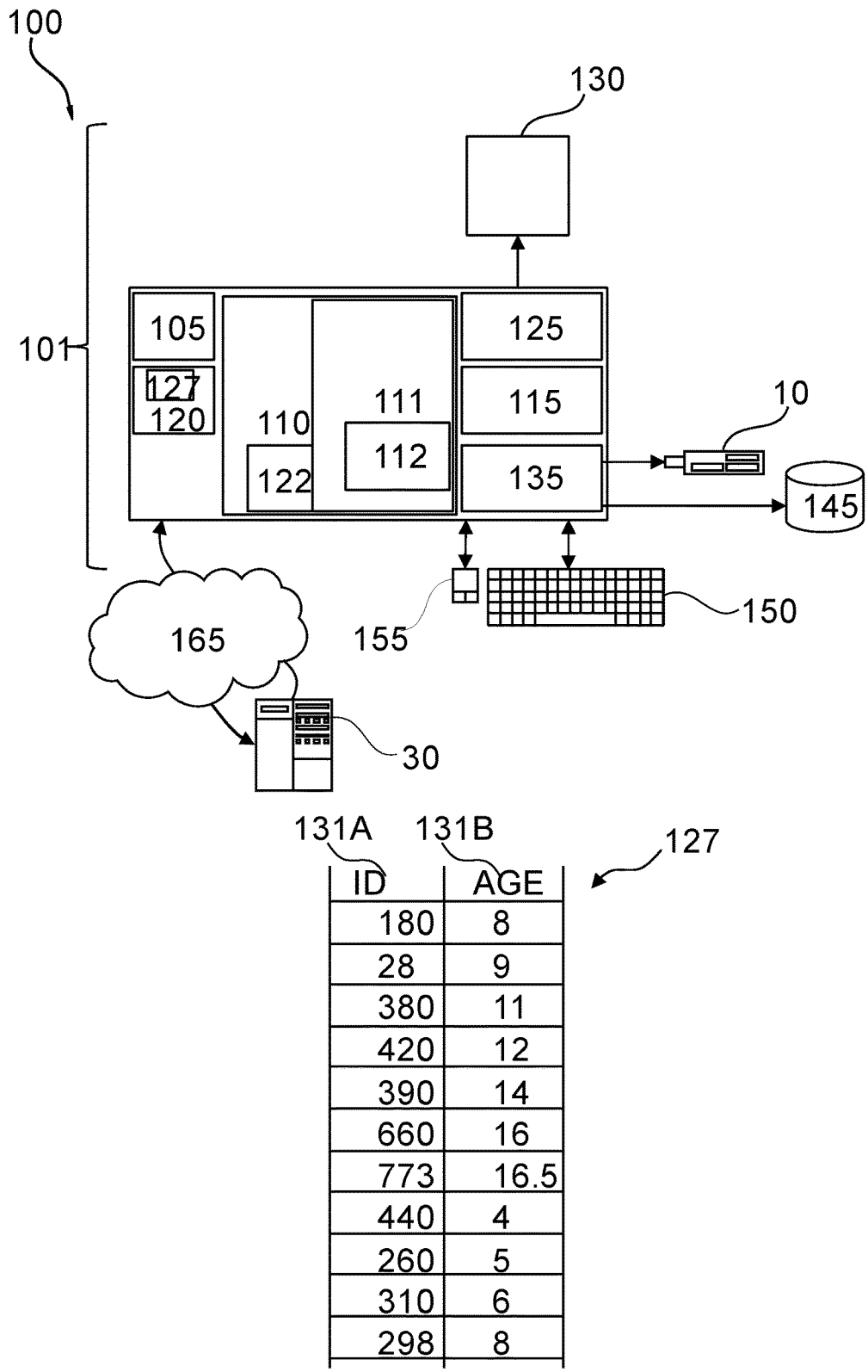
FIG. 1 is a block diagram of the internal and external components of a computer system, in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "extent" as used herein may refer to a logical or physical storage unit (e.g. contiguous area of storage) for storing the data of the data table. The extent may be one of the storage units that are handled by a database management system or an operating system. The extent may for example be the smallest or second smallest storage unit in a hierarchy of storage units used by the database.

Generally, a zone map contains information about minimum and/or maximum values of at least one attribute in a set of records. In various data management systems a zone map may be known by other names. For example, a zone map may be referred to as an 'attribute value information' or 'synopsis information'. Regardless the minimum and/or maximum values are guaranteed lower and upper bounds. Usually the minimum and/or maximum values are extreme values when they are determined; however, later changes in the data may cause them not to be guaranteed lower/upper bounds (zone map entries are not always updated when data is updated).

Zone maps may be used to optimize I/O in a variety of systems for example, IBM PUREDATA®. Zone maps are often efficient if loaded data has some natural order. Generally, data in OLTP systems are naturally ordered by time because they are just inserted over time. Zone maps are anti-indexed and managed completely by the appliance. Useless data may be filtered by Zone maps during a query execution. Generally, data is divided into 3MB extents. Each extent maintains statistics (zone maps) for scalar columns. The statistics determine the min. and max. values stored within each extent.

Embodiments of the present invention may optimize extents size in order to provide an improved zone map statistic.

Embodiments of the present invention may use zone maps which may allow new zones to be started earlier than usual, when the data indicates a good position for concise min/max ranges. For example, if values suddenly differ by a large amount and the current zone is 'relatively' full, then a new zone may be started despite the current zone not yet being 100% full.

Embodiments of the present invention may reduce false positive rates caused by gaps in the value distribution of attributes (e.g., false positive: an extent is accessed but contains no rows or records matching the query predicate). A gap is a range of values of the attribute, wherein the attribute of a given extent has no value within the gap.

Embodiments of the present invention may store incoming table rows to extents. Generally, extents have a predefined size. The size of an extent may be either a fixed size or a fixed number of rows. Generally, data management systems may completely fill a currently used extent prior to starting a new extent. Additionally, and/or alternatively, embodiments of the present invention may start a new extent prior to an existing one being full. For example, a data management system may attribute a value to incoming columns, and based on the value, start a new extent. For instance, the decision about starting a next extent may be made by analyzing the trend of the data. In another instance, the decision about starting a next extent may be made by attempting to maintain a low difference between minimum and maximum values in the attribute value information.

Embodiments of the present invention may recognize and organize columns, provided the columns are defined on the table in question. Additionally, columns declared as 'unique', 'primary key', or 'auto-increment' may receive special consideration, as the columns are likely to grow monotonously.

The attribute value information may be descriptive of the attribute. Using the attribute value information a preselection of extents may be performed before scanning the preselected extents. The attribute value information may comprise information or metadata on the attribute that allows such a preselection. In one example, the attribute value information may comprise at least one of the following: minimum attribute value of the attribute in the extent, or maximum attribute value of the attribute of the extent. For example, the at least one attribute may comprise multiple attributes. In this case, the step of processing may involve one or more attributes of the multiple attributes.

For example, the maximum and the minimum attribute values define a first range of values of the attribute in a respective extent. For instance, a received data query may require a second range of values of the attribute. The processing of the data query may comprise selecting extents whose respective first range overlaps with the second range and processing those selected extents.

Using attribute value information associated with each extent as a query, may be processed by first determining a scan list of extents that may satisfy the query, for which the attribute value information may be used. For example, if the query condition is "AGE<18", then the attribute value information may be used to exclude or skip extents that have a minimum attribute value which is equal to or higher than '18'.

According to an embodiment, determining the range of values, the attribute may utilize the attribute value of the (i) current data record, and (ii) attribute values of the attribute of the previously stored data records in the current extent. If the determined range of values is higher than a predefined maximum range, then the current data record is stored in the next extent. Alternatively, the current data record is stored in the current extent. This embodiment for processing range queries may save time and processing resources that would otherwise be required to perform unnecessary scans of extents whose range of values are not controlled, e.g., too large, too small, etc.

In the case where the determined range of values is higher than the predefined maximum range, this scenario may prevent empty extents which waste storage resources. Therefore, the current data record is stored in the next extent, only when the current extent comprises a minimum number of records.

An embodiment of the present invention may maintain extents of different sizes. Embodiments of the present invention may decide during the load (i.e., at runtime) when extent should be closed. For example, a new extent may be started based on: (i) analyzing the trend of data (natural order); or (ii) trying to greedily maintain a low difference between minimum and maximum values of a zone map.

Embodiments of the present invention (i) maintain extents of various sizes as well as (ii) decide when an extent is to be closed, during runtime (load). Embodiments of the present invention exploit two indicators when deciding when the next extent should be started. The first indicator is known as the 'natural order' whereby the trend of data is analyzed. The second indicator may be referred to as the 'greedy method', whereby a low difference between the minimum and maximum values of the zone map is maintained.

In reference to the first indicator ('natural order'), generally, only the subsets of columns are naturally ordered. Therefore, by determining which columns during the load (or sample of the initial data) may be analyzed, may assist in determining which columns are naturally ordered. It is noted that, the order does not have to be ascending nor descending. For example, data may be loaded from different entities at the end of each day. Therefore, in this scenario, even if data from each entity is not loaded in order, it may be valuable to detect that data may be ordered by each entity. In another scenario data may be loaded from different shops (one by one). Even if data from shops are not loaded in order of the shops identification, it is still valuable to detect that data are ordered by shops.

In order to analyze the trend of data using the natural order, it is often sufficient to maintain an average of deltas for each column. Generally, the lower the average the more monotonous the data is. An embodiment of the present invention may analyze the trend of data in order to evaluate the average of deltas for column c by using the following formula: $M_c = \Sigma_{i=1}^{l}(X_{C,i} - X_{C,i-1})$, where $M_c$ is the average number of deltas for column c; 1 is the number currently most recently loaded record; $x_{c,i}$ is the value in column c in the $i^{th}$ loaded record. Generally, $M_c$ reflects monotonicity of loaded data. In an embodiment, when loading data, the naturally ordered columns (low values of $M_c$) may be tracked in order to detect a 'jump point'. If for example, the jump point occurs the load algorithm may close the current extent and start a new one. If there is a correlation between deltas from different columns, then it means that these columns may be tracked together for discontinuity. Thereby creating a correlation in columns as an increased quantity of zone maps statistics may benefit.

An embodiment of the present invention may calculate the quality of zone maps by using the following formula:

$$M_c = \sum_{i=1}^{l} \frac{(x_{c,i} - c_{c,i-1})}{l},$$

where $M_c$ is the average number of deltas for column c; 1 is the number of data records previously stored in the current extent plus the current data record; $x_{c,i}$ is the value of the attribute in column c of the $i^{th}$ respective data record. It is noted that, $M_c$ reflects monotonicity of the loaded data while overlooking the aspect that data may only be monotonic in ranges. When the average delta is compared with a predefined maximum and the average delta is higher than the predefined maximum then the current data record is stored in the next extent. Those skilled in the art will recognize that this embodiment may particularly be advantageous for attributes that are naturally ordered. For example, the attribute c may be a timestamp indicating the time at which the current data record is received and/or loaded in order to be processed. Data records are received one after the other following a chronological time order, thereby providing a uniform filing of extents which may increase the query execution performance using the attribute value information.

Referencing the second indicators when deciding when the next extent should be started is based on the greedy method. Since a portion of loaded data manifests natural order only locally, order may be preserved on different columns. However, that may not always be true. Therefore it may become difficult to determine which columns may be tracked for monotonicity. Under the greedy method, the loading algorithm may maintain the measure of quality of zone maps for current extent. According to embodiments of the present invention, the at least one attribute comprises multiple $n_c$ attributes. The processing may comprises: evaluating the following formula: $m=\Sigma_{c=0}^{nc}(zmax_c-zmin_c)$, where m is the quality of zone maps in current extent, $max_c$ is the maximum value of the attribute c in the first set of data records and in the second set of data records respectively, $zmin_c$ is the minimum value of the attribute c in the first set of data records and the second set of data records respectively($zmax_c$ and $zmin_c$ are zone maps statistics for column c for current extent). It is noted that q is the quality degradation threshold. It is noted that using a first set of data records may be used for obtaining quantity m as well as a second set of data records for obtaining quantity m' (where m' is the quality of zone maps in current extent if next record would be added). Whereby the first set of data records may comprise the previously stored data records of the current extent, while the second set of data records comprise the previously stored data records of the current extent in addition to the current data record. The quantities m and m' are compared and based on the comparison result performing the storing of the current data record in the current extent or in the next extent. This embodiment may improve the query execution performance using the attribute value information for queries involving conditions on multiple attributes of the data records.

According to an embodiment, the data records may be received from one or more sources. Initially, the source of the current data record may be determined. If it is determined that the source is different from one or more sources of the data records previously stored in the current extent, then the current data record may be stored in the next extent. If it is determined that the current data record is from the same source, then the current data record is stored in the current extent.

According to an embodiment, the attribute value information may comprise a maximum and a minimum value of the attribute in the current extent. For example, the attribute value information may comprise the maximum and minimum number of characters in the extent if the attribute is a string. In another example, the attribute value information may comprise the maximum distance (e.g. to a given reference point) in the extent if the attribute is a geographical location.

FIG. 1 represents a general computerized system, suited for implementing method steps as involved in the disclosure. Specifically, FIG. 1 is a block diagram of internal and external components of a computer system 101.

It will be appreciated that the methods described herein are at least partly non-interactive, and automated by way of computerized systems, such as servers or embedded systems. In exemplary embodiments though, the methods described herein can be implemented in a (partly) interactive system. It should be appreciated that FIG. 1 provides only an illustration of one implementation, and does not imply any limitations with regard to the environments in which different embodiments may be implemented. Many modifications to the depicted environment may be made. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art. I/O interface(s) allows for input and output of data with other devices that may be connected to computer system 101. For example, I/O interface may provide a connection to external devices such as a keyboard 150, mouse 155, a touch screen (not shown), and/or some other suitable input device. External devices can also include portable computer readable storage media 10 such as, for example, thumb drives, portable optical or magnetic disks, and memory cards. Software and data used to practice embodiments of the present invention, can be stored on such portable computer readable storage media and can be loaded onto memory 110 via I/O interface(s). I/O interface(s).

Computer system 101 may include communications fabric (not shown), which provides communications between computer processor(s) 105, memory 110, persistent storage (not shown), communications unit (not shown), and input/output (I/O) interface(s) 135. Communications fabric can be implemented with any architecture designed for passing data and/or control information between processors (such as microprocessors, communications and network processors, etc.), system memory, peripheral devices, and any other hardware components within a system. For example, communications fabric can be implemented with one or more buses.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macro-processor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105. Memory 110 is computer readable storage media. In this embodiment, memory 110 may include random access memory (RAM) and cache memory. In general, memory 110 can include any suitable volatile or non-volatile computer readable storage media.

Memory 110 may include, for example, a plurality of magnetic hard disk drives. Programs are stored in memory 110 for execution and/or access by one or more of the respective computer processors 105 via one or more memories of memory 406. In this embodiment, memory 110 includes a magnetic hard disk drive. Alternatively, or in addition to a magnetic hard disk drive, memory 110 can include a solid state hard drive, a semiconductor storage device, read-only memory (ROM), erasable programmable read-only memory (EPROM), flash memory, or any other computer readable storage media that is capable of storing program instructions or digital information. The media used by memory 110 may also be removable. For example, a removable hard drive may be used for memory 110. Other examples include optical and magnetic disks, thumb drives, and smart cards that are inserted into a drive for transfer onto another computer readable storage medium that is also part of memory 110.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Communications unit (not shown), provides for communications with other data processing systems or devices. In these examples, communications unit includes one or more network interface cards. Communications unit may provide communications through the use of either or both physical and wireless communications links. Software and data used to practice embodiments of the present invention can be downloaded to computer system 101 through communications unit (i.e., via the Internet, a local area network, or other wide area network). From communications unit, the software and data may be loaded to memory 110.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165, through for example, communication unit. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

Display 130 provides a mechanism to display data to a user and may be, for example, a computer monitor. Display 130 can also be an incorporated display and may function as a touch screen, such as a built-in display of a tablet computer If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The system 100 may have access to at least one data table (or data set) 127. For example, the software 112 may receive (automatically or upon request) as input the data table 127, or may download the data table 127 from a source system that is e.g. connected to the system 100. For simplification purpose data table 127 is shown as part of storage 120 but it can be stored in memory 110 or any other storage to which the system 100 has access.

The data table 127 may comprise one or more columns 131A-B, wherein each column is represented by a respective attribute (e.g., "ID" 131A and "Age" 131B). The rows or records of the data table 127 may comprise values of the attributes.

The term "data table" or data set as used herein refers to a collection of data that may be presented in tabular form. Each column in the data table may represent a particular variable or attribute. Each row in the data table may represent a given member, record or entry of the data table.

While FIG. 1 only shows a few attributes, it will be appreciated that numerous attributes may exist or may be used.

Figures 2A, 2B:
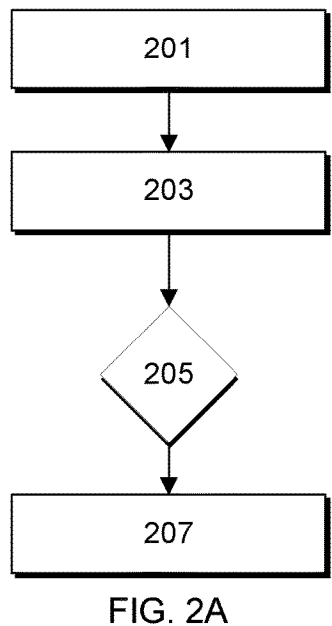
FIG. 2A is a flowchart illustrating operational steps for storing data records in accordance with an embodiment of the present invention.
FIG. 2B is an exemplary data table depicting data records, in accordance with an embodiment of the present invention.

FIG. 2A is a flowchart of a method for storing data records 221A-N, as depicted in FIG. 2B. Data records 221A-N may be located in data table 127 in extents, as depicted in FIG. 1. In one example, the data records 221A-N may or may not be in a natural order e.g., 221A<221B<221C, and so on.

For example, the data records 221A-N may be received at computer system 100 e.g., from another computer or storage system, in order to be stored at the computer system 100 or in another storage system that is controlled by the computer system 100.

In another example, the data records may be read or accessed or downloaded in order to be stored in accordance with the present method.

The data records 221A-N may comprise all or part of the data table 127. For example, the number of data records to be stored may be limited to a maximum number of data records. For example, the method may comprise downloading or receiving the data records 221A-N record by record (e.g., in their natural order) until the maximum number of data records is reached.

The data records may be received or downloaded from one or more data sources. A data source may for example comprise a relational data source, memory collections, XML files, database etc. The data records 221A-N have attributes e.g., 131A-B.

The method comprises processing record by record the data records 221A-N to be stored in the extents. Each extent may comprise a maximum number of records or a maximum size of data.

The data records may be stored in a given extent until a decision is made to stop storing in the given extent (and closing the given extent) and further records may be stored in another extent and so on until the data records to be stored are stored. The decision may be based on the fact that the given extent is full or may be based on other criteria as described below.

For example each received or downloaded data record of the data records to be stored may be processed as follows in steps 201-207.

In step 201, for a current data record the value of the attribute of the current data record may be processed together with attribute values of the attribute of data records previously stored in a current extent that is still being used for storing data records. For example, the current data record may be the 10$^{th}$ record to be processed and the 9 records that are previously processed are stored in the current extent. Thus, in step 201, the attribute values or the 9 last records and the current data record are processed.

In another example, the current data record may be the 10th record to be processed and the first 5 records that are previously processed are stored in a previous extent that is not used anymore. For example, the previous extent is not used as it may be full. However, the last 4 data records that are previously processed are stored in the current extent being used. Thus, in step 201, the attribute values for the 4 last records and the current data record are processed.

The processing of step 201 may for example comprise determining the range of values of the attribute using the attribute value of the attribute of the current data record and the attribute values of the attribute of the previously stored data records in the current extent. For example, referencing FIG. 2B, if the current extent comprises the records 221A-D and the current data record is 221E, the range of values of the attribute 131B would be [8 14] where 8 is the minimum attribute value and 14 is the maximum attribute value in the current extent.

In an embodiment, the attribute being used in step 201 may be randomly selected among the other attributes 131A-B. In an embodiment, the attribute being used in step 201 may be user defined. For example, the attribute used in step 201 may be identified using an initial or test data. Usually only subsets of columns or attributes are naturally ordered. The present method may determine which attributes during the load or the sample of initial data can be taken to determine which attributes are naturally ordered. The order does not have to be ascending or descending. The attribute used in step 201 may be an attribute that is naturally ordered such as a timestamp.

In another example, multiple attributes may be processed in step 201 e.g., 131A and 131B. For instance, what is described for the single attribute in step 201 may be repeated or performed for the multiple attributes. In such a case, the range of values of the attribute 131A and 131B may be determined (as described herein) using the attribute values of the attributes 131A-B of the current data record and the attribute values of the attribute 131A-B of the previously stored data records in the current extent. Thereafter, both determined ranges may be compared to the predefined maximum range, and if at least one of the determined ranges is higher than the predefined maximum range, the current data record may be stored in the next extent.

Responsive to the processing results, in step 203, it may be determined to store the current data record in the current extent or to store the current data record in a next extent. The next extent then would become the current extent for a next data record of the data records to be stored. Using the above example of attribute range values, step 203 may comprise: in case the determined range of values is higher than a predefined maximum range performing the storing of the current data record in the next extent, otherwise performing the storing of the current data record in the current extent.

With reference to FIG. 3, graph 300 illustrates the attribute values that are covered by the data records in each extent, in accordance with an embodiment of the present invention. Exemplary graph 300 depicts each extent as being limited to 100 records. For illustration purposes, the first extent 307.1, comprises records having attribute values of the attribute 131B that goes from a minimum of 8 to a maximum of 9.

For example, assuming the processing is at the current extent, 307.6 with a respective data record 309 (it is noted that the attribute value is 4). Since the current extent already comprises records whose attribute values vary from 16 to 16.5. As illustrated in the graph 300, the record 311 having attribute value 16.5 may be the last record that has been processed. Using the present method the current extent will be closed. Responsive to closing the current extent, the current data record 309 may be stored in a next extent. This would prevent having an extent that may comprise a large range of values of the attribute e.g. 4 to 16.5 as illustrated by the jump point from 16.5 to 4. However an increase the false positive rates may occur. As illustrated in the graph 300 the next extent would then have a range of values 4 to 5 instead of 4 to 16.5.

In case it is determined that the current data record to be stored in the next extent (step 205) attribute value information of the current extent may be determined in step 207 and the determined attribute value information may be saved in association with the current extent. For example, if the attribute value information and the extent to which it is associated, are saved together this indicates they both correspond to each other. In another example, the attribute value information and the associated extent are stored separately however such may have pointers/addresses or links to the associated extent.

Embodiments of the present invention may maintain extents of different sizes decide during the load (in the runtime) when extent should be closed. FIGS. 4A and 4B depict a couple of indicators which may be used for deciding when next extent should be started. FIG. 4A depicts flowchart 400, which describes a method for analyzing the trend of data (natural order), in accordance with an embodiment of the present invention. FIG. 4B depicts flowchart 450, which describes a method trying to greedily maintain low difference between min and max value of attribute values in extents, in accordance with an embodiment of the present invention.

FIG. 4A is a flowchart of a method further detailing steps 201 and 203 of Flowchart 200. Flowchart 400 illustrates analyzing a trend of data. The attribute may for example be a naturally ordered attribute such as time. The records are processed one after the other with respect to their time of reception or time of download.

In step 401, an average delta may be evaluated of the attribute using the following formula:

$$M_c = \sum_{i=1}^{l} \frac{(x_{c,i} - c_{c,i-1})}{l}.$$

The attribute is referred to as "c". The variable l is the number of data records previously stored in the current extent plus the current data record, and $x_{c,i}$ is the value of the attribute of the $i^{th}$ respective data record.

For example, if the current extent comprises 4 data records, l will be equal to 5 (4 data records plus the current data record being processed). Using the above example, if the current extent comprises the records 221A-D and the current data record is 221E, assuming that the 221A-D are processed or stored in their alphabetical order that follows the order of their time of reception of time of download. The Mc=[(9−8)+(11−9)+(12−11)+(14−12)]/5.

The average delta Mc reflects monotonicity of loaded data but it may ignore the fact that data are only monotonic in ranges.

In case of processing multiple attributes, multiple Mc may be determined in step 401 for each of the multiple attributes. Using multiple attributes may be advantageous. For example, if there is a correlation in-between deltas from the different attributes which may mean that these attributes can be tracked together for discontinuity (for detecting the "jump" that would indicate to store the current record being processed in a next extent). It may be preferred to optimize for correlated attributes as in such case more attribute value information may benefit from it.

In step 403, the average delta Mc is compared with a predefined maximum such that the storing of the current data record may be performed in the next extent if the average delta is higher than the predefined maximum (e.g. 10%). If multiple attributes are used, at least part of the determined averages deltas of the multiple attributes may each be compared to the predefined maximum and if at least one of them is higher than the predefined maximum the current data record may be stored in the next extent.

FIG. 4B is a flowchart of another method further detailing steps 201 and 203. Specifically, flowchart 450 depicts the greedy method. In this example, multiple attributes may be used to store the data records.

In step 451, the following formula: $\Sigma_{c=0}^{nc}(zmax_c - zminx_c)$ may be used to evaluate a first set of data records for obtaining quantity m and a second set of data records for obtaining quantity m'. The first set of data records comprises the previously stored data records of the current extent, while the second set of data records comprises the previously stored data records of the current extent in addition to the current data record.

Variables, $zmax_c$ is the maximum value of the attribute c in the first set of data records and in the second set of data records respectively, and $zmin_c$ is the minimum value of the attribute c in the first set of data records and the second set of data records respectively. nc is the number of attributes of the data records to be stored.

In step 453, the quantities m and m' may be compared and based on the comparison result the storing of the current data record may be performed in the current extent or in the next extent.

The method of FIG. 4B may be advantageous as some loaded data manifests natural order on a local scale. Thus the order is preserved on different attributes. In this scenario, it becomes difficult to determine which attributes should be tracked for monotonicity (which attributes are naturally ordered).

The method may for example comprise: (i) a new extent is created; (ii) data are loaded until current extent reaches size of $E_{min}$; (iii) m is calculated for current extent; (iv) new record is taken from input and m' is calculated; (v) if (m'−m)<q(m'−m)<q then record is added to extent and next record is taken (go to c.); and (vi) if then record is not inserted into current extent but rather a new extent is created (goto a.).

The q parameter can be determined in several ways. (i) In one example, q may be zero. In this way size extents is maintained unless adding a new record degrade attribute value information. (ii) In another example, q may be some hardcoded value which is setup during system production or configured later on. (iii) In another example, q may dynamically be changed.

In another example, a computer-implemented method for processing a data table in a database management system may be provided. The data table having a set of attributes. The method comprises: receiving data rows for the data table; storing the received data rows to a current extent (an extent has a fixed size or a fixed number of records) until it is determined to start storing the received data rows to a next extent; monitoring values of at least one attribute in the received data rows; determining based on the monitored values when to start storing data rows to the next extent, and storing attribute value information (e.g., min/max values for a given set of attributes) for the current extent after starting storing received data rows to the next extent. The decision about starting a next extent can be made, for example, by analyzing the trend of the data or by trying to greedily maintain a low difference between min and max values in the attribute value information.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for storing data records in extents, the method comprising:
   receiving, by one or more processors, a data record comprising an attribute value;
   identifying, by one or more processors, one or more data records stored in a first extent, wherein the stored one or more data records in the first extent have at least one attribute value, and wherein the first extent is of a predetermined size;
   comparing, by one or more processors, the attribute value of the received data record to the attribute values of the identified one or more data records stored in the first extent;
   determining, by one or more processors, whether to store the received data record in the first extent;
   responsive to determining, not to store the received data record in the first extent, storing, by one or more processors, the received data record in a second extent, wherein the second extent is of a predetermined size; and
   responsive to storing the first received data record in the second extent,
   determining, by one or more processors, an attribute value information of the second extent, and associating said value with the second extent;
   wherein determining whether to store the received data record in the first extent further comprises:
   identifying, by one or more processors, an average delta of the attribute, wherein the average delta of the attribute is equal to:

$$M_c = \sum_{i=1}^{l} \frac{(x_{c,i} - c_{c,i-1})}{l}$$

wherein l is the number of data records previously stored in the current extent plus the current data record, $x_{c,i}$ is the value of the attribute of the $i^{th}$ respective data record;
   comparing, by one or more processors, the average delta with a predefined maximum; and
   storing, by one or more processors, the current data record in the second extent responsive to detecting that the average delta is higher than the predefined maximum.

2. The method of claim 1, further comprising:
   detecting, by one or more processors, a range of values of an attribute based in part on the attribute value of the received data record and the attribute values of the identified one or more data records stored in an first extent;
   determining, by one or more processors, whether the range of values is higher than a predefined maximum range;
   responsive to determining the range of values is higher than a predefined maximum range storing, by one or more processors, the received data record in the second extent; and responsive to determining the range of values is equal to or less than a predefined maximum range storing, by one or more processors, current data record in the first extent.

3. The method of claim 2, wherein storing the received data record in the second extent is based in part on:
the determining the range of values is higher than a predefined maximum range; and
that the first extent comprises a predefined minimum number of records.

4. The method of claim 1, wherein determining whether to store the received data record having an attribute value in the first extent further comprises:
identifying, by one or more processors, a quantity m and a quantity m', wherein m is a quantity based on the identified data records stored in a first extent, and m' is a quantity based on the identified data records stored in a first extent and the received data record;
determining, by one or more processors, whether the at least one attribute comprises multiple $n_c$ attributes, wherein determining whether the at least one attribute comprises multiple $n_c$ attributes is equal to:

$$\sum_{c1}(z\delta_c^i - z\delta\delta_c^i),$$

wherein attribute c is a determined attribute value based on the identified data records stored in a first extent and attribute value based on the identified data records stored in a first extent and the received data record, $zmax_c$ is the maximum value of the attribute c, and $zmin_c$ is the minimum value of the attribute c;
comparing, by one or more processors, the quantities m and m'; and
responsive to comparing the quantities m and m' determining the location to store the received data record, storing, by one or more processors, the received data record in either the first extent or in the second extent.

5. The method of claim 1, further comprises:
identifying, by one or more processors, a source of the received data record;
determining, by one or more processors, whether the source of the received data record matches one or more sources of the identified data record stored in the first extent;
responsive to determining the determined source is different from one or more sources of the identified data records stored in the first extent, storing, by one or more processors, the received data record in the second extent; and
responsive to determining the determined source matches one or more sources of the identified data records stored in the first extent, storing, by one or more processors of the received data record in the first extent.

* * * * *